(12) United States Patent
Srivastava et al.

(10) Patent No.: US 11,662,886 B2
(45) Date of Patent: May 30, 2023

(54) SYSTEM AND METHOD FOR DIRECTLY SENDING MESSAGES WITH MINIMAL USER INPUT

(71) Applicant: TALENT UNLIMITED ONLINE SERVICES PRIVATE LIMITED, Delhi (IN)

(72) Inventors: Gaurav Srivastava, Lucknow (IN); Ankit Prasad, Gurugram (IN); Rahul Prasad, Gurugram (IN)

(73) Assignee: TALENT UNLIMITED ONLINE SERVICES PRIVATE LIMITED, Delhi (IN)

( * ) Notice: Subject to any disclaimer, the term of this patent is extended or adjusted under 35 U.S.C. 154(b) by 0 days.

(21) Appl. No.: 17/367,098

(22) Filed: Jul. 2, 2021

(65) Prior Publication Data
US 2022/0004289 A1 Jan. 6, 2022

(30) Foreign Application Priority Data
Jul. 3, 2020 (IN) .............................. 202011028354

(51) Int. Cl.
G06F 3/048 (2013.01)
G06F 3/0482 (2013.01)
G06F 3/04886 (2022.01)
H04L 51/42 (2022.01)

(52) U.S. Cl.
CPC ........ *G06F 3/0482* (2013.01); *G06F 3/04886* (2013.01); *H04L 51/42* (2022.05)

(58) Field of Classification Search
CPC ............. G06F 3/04886; G06F 3/04883; G06F 3/0488; G06F 3/04817; G06F 3/03547; G06F 2203/04104; G06F 21/83; G06F 3/0426; G06F 1/1662; G06F 3/0238
See application file for complete search history.

(56) References Cited

U.S. PATENT DOCUMENTS

| | | | | |
|---|---|---|---|---|
| 5,117,450 A | * | 5/1992 | Joglekar | H04M 1/724 455/567 |
| 6,727,916 B1 | * | 4/2004 | Ballard | G06Q 10/107 715/758 |
| 9,716,680 B2 | * | 7/2017 | Taler | H04L 51/18 |
| 10,003,964 B1 | * | 6/2018 | Blintsov | H04L 63/0428 |

(Continued)

*Primary Examiner* — Steven B Theriault
(74) *Attorney, Agent, or Firm* — Barry Choobin; Patent 360 LLC (57) ABSTRACT

A system including a direct message sending engine (DMSE) and a method for directly sending messages with minimal user input are provided. When a user invokes an input interface proximal to an input message field (IMF) of a user application, the DMSE renders a list of preconfigured messages on the input interface. When the user performs a selection action on at least one of the preconfigured messages on the input interface, the DMSE receives the selection action and in response, the DMSE transforms properties of the IMF, commits the preconfigured message(s) to the IMF, and simultaneously and directly sends the preconfigured message(s) to a recipient device. On committing the preconfigured message(s) to the IMF, the DMSE simultaneously executes a programmatic simulation of an action key press, thereby directly sending the preconfigured message(s) to the recipient device free of a manual user input.

8 Claims, 10 Drawing Sheets

(56) References Cited

U.S. PATENT DOCUMENTS

| | | | | |
|---|---|---|---|---|
| 10,445,425 B2* | 10/2019 | Jon | | G06F 40/274 |
| 10,686,745 B2* | 6/2020 | Schmid | | H04L 51/02 |
| 10,965,629 B1* | 3/2021 | Bekmambetov | | H04L 51/046 |
| 11,025,565 B2* | 6/2021 | Sridhar | | H04L 51/02 |
| 11,165,903 B1* | 11/2021 | Shin | | G06F 3/0482 |
| 2002/0054072 A1* | 5/2002 | Hayes-Roth | | G06Q 10/107 |
| | | | | 715/727 |
| 2003/0020692 A1* | 1/2003 | Griffin | | G06F 3/0383 |
| | | | | 345/168 |
| 2008/0201438 A1* | 8/2008 | Mandre | | H04L 51/04 |
| | | | | 709/206 |
| 2009/0138556 A1* | 5/2009 | Corry | | G06Q 10/10 |
| | | | | 709/206 |
| 2012/0064924 A1* | 3/2012 | Schapsis | | H04W 4/14 |
| | | | | 455/466 |
| 2014/0122056 A1* | 5/2014 | Duan | | H04L 51/02 |
| | | | | 704/9 |
| 2014/0297758 A1* | 10/2014 | Kidron | | G01C 21/3492 |
| | | | | 709/206 |
| 2014/0317030 A1* | 10/2014 | Shen | | G06N 3/006 |
| | | | | 706/46 |
| 2015/0350118 A1* | 12/2015 | Yang | | G06F 40/279 |
| | | | | 715/752 |
| 2016/0124636 A1* | 5/2016 | Valade | | G06F 3/0481 |
| | | | | 715/773 |
| 2016/0224524 A1* | 8/2016 | Kay | | G06F 3/0237 |
| 2016/0307097 A1* | 10/2016 | Lu | | H04L 51/16 |
| 2017/0308290 A1* | 10/2017 | Patel | | G06F 16/9535 |
| 2018/0063040 A1* | 3/2018 | Rensburg | | G06F 40/166 |
| 2018/0143760 A1* | 5/2018 | Orr | | G06F 3/0233 |
| 2020/0021542 A1* | 1/2020 | Zhang | | G06F 16/435 |
| 2020/0272287 A1* | 8/2020 | Yang | | G06F 3/0482 |
| 2021/0042075 A1* | 2/2021 | Viedt | | G06F 3/167 |
| 2022/0004289 A1* | 1/2022 | Srivastava | | G06F 3/04895 |

* cited by examiner

SYSTEM AND METHOD FOR DIRECTLY SENDING MESSAGES WITH MINIMAL USER INPUT

CROSS-REFERENCE TO RELATED APPLICATIONS

This application claims priority to and the benefit of the non-provisional patent application titled "System and Method for Directly Sending Messages with Minimal User Input", application number 202011028354, filed in the Indian Patent Office on Jul. 3, 2020. The specification of the above referenced patent application is incorporated herein by reference in its entirety.

BACKGROUND

Technical Field

The embodiments herein, in general, relates to message transmission. More particularly, the embodiments herein relate to a system and a method for directly sending messages with minimal user input.

Description of the Related Art

Typically, when a user wishes to send a message to a recipient via a messaging application, the user has to enter text into an input text box provided on a graphical user interface (GUI) of the messaging application and manually press an action key, for example, an "enter" key, positioned proximal to the input text box on the GUI to send the message to the recipient. This method is time consuming and restricts a user's experience when the user needs to send multiple different messages to different recipients. There is a need for allowing the user to quickly select and send a message to a recipient with minimal input. Moreover, some users may find it difficult to express and communicate their thoughts or ideas in a quick and adequate manner. Therefore, there is a need for providing a list of preconfigured messages for convenient selection by a user to allow the user to quickly and adequately express and communicate their thoughts or ideas to a recipient with a single action or with minimal input. Furthermore, there is a need for allowing users to append preconfigured messages to a previously entered message in an input text box and directly send the combination message to a recipient.

Hence, there is a long-felt need for a system and a method for directly sending messages with minimal user input in a time-efficient manner for an enhanced messaging experience.

OBJECTS OF THE EMBODIMENTS HEREIN

An object of the embodiments herein is to develop a system and a method for directly sending messages with minimal user input in a time-efficient manner for an enhanced messaging experience.

Another object of the embodiments herein is to render a list of preconfigured messages on an input interface for convenient selection by a user to allow the user to quickly and adequately express and communicate their thoughts or ideas to a recipient with a single action or with minimal user input.

Yet another object of the embodiments herein is to transform properties of an input message field and programmatically simulate an action key press to allow direct sending of a selected message to a recipient device.

Yet another object of the embodiments herein is to allows users to send messages, for example, clips from a clipboard, quick replies, etc., directly with a single action such as a single tap action or a single click action without having to manually press an action key, for example, an enter key or a return key, provided proximal to an input message field, thereby enhancing the user's messaging experience.

Yet another object of the embodiments herein is to allow users to enter a message in an input message field and select one or more preconfigured messages from a list of preconfigured messages, which are appended to the previously entered message and directly sent to a recipient.

The objects disclosed above will be realized and achieved at least by the elements, features, and combinations particularly disclosed in the detailed description that follows. The objects disclosed above have outlined, rather broadly, the features of the embodiments herein in order that the detailed description that follows may be better understood. The objects disclosed above are not intended to determine the scope of the claimed subject matter and are not to be construed as limiting of the embodiments herein. Additional objects, features, and advantages of the embodiments herein are disclosed below. The objects disclosed above, which are believed to be characteristic of the embodiments herein, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The embodiments herein address the above-recited need for a system and a method for directly sending messages with minimal user input in a time-efficient manner for an enhanced messaging experience. The embodiments herein allow a user to directly send a message with minimal user input, for example, with a single action, thereby saving the time of the user and enhancing the user's messaging experience.

The system and the method disclosed herein employ a direct message sending engine (DMSE) and at least one processor for directly sending messages, for example, preconfigured messages, with minimal user input in a time-efficient manner for an enhanced messaging experience. The DMSE comprises one or more modules defining computer program instructions, which when executed by the processor(s), cause the processor(s) to directly send messages with minimal user input in a time-efficient manner for an enhanced messaging experience.

According to one embodiment of the invention, a system for directly sending messages with minimal user input is provided. The system comprises an electronic device which comprising an input device, at least one processor, a memory unit operably and communicatively coupled to the at least one processor, and a display unit. The system further comprises a sensing unit comprising one or more of a plurality of sensors operably coupled to the at least one processor of the electronic device. Furthermore, the system comprises a direct message sending engine operably coupled to the sensing unit, the at least one processor, and a messaging application deployed on the electronic device.

The direct message sending engine configured to execute a series of functions including receiving of a user selection action from the input device of the electronic device to invoke an input interface of the messaging application, rendering of a list of preconfigured messages to be displayed on the display unit based on the received user selection action, receiving a single action executed on at least one of the list of preconfigured messages, and transforming properties of an input message field of the input interface. Further, the direct message sending engine configured to commit the at least one of the list of preconfigured messages to the input message field based on the transformed properties of the input message field and execute a simulation of an action key press to send the at least one of the list of preconfigured messages to a recipient device.

When a user invokes an input interface, for example, a touch-enabled keyboard interface, proximal to an input message field provided by a user application, for example, a messaging application, on a user device, the DMSE renders a list of preconfigured messages on the input interface. When a user performs a single selection action, for example, a tap action or a click action, on at least one of the preconfigured messages on the input interface, the DMSE receives the selection action from the user device. In response to the selection action, the DMSE transforms properties of the input message field, commits the selected preconfigured message(s) to the input message field, and simultaneously and directly sends the selected preconfigured message(s) to a recipient device. On committing the selected preconfigured message(s) to the input message field, the DMSE simultaneously executes a programmatic simulation of an action key press, thereby directly sending the selected preconfigured message(s) to the recipient device free of a manual send action user input.

In an embodiment, on invoking the input interface to initiate messaging through the user application, the user may enter an input message in the input message field and then select at least one preconfigured message(s). In this embodiment, in response to the selection action, the DMSE transforms the properties of the input message field and appends the selected preconfigured message(s) to the input message entered in the input message field. On appending the preconfigured message(s) to the input message entered in the input message field, the DMSE simultaneously executes a programmatic simulation of the action key press, thereby directly sending the input message appended with the selected preconfigured message(s) to the recipient device free of a manual send action user input. After sending the input message appended with the selected preconfigured message(s), the DMSE restores the properties comprising, for example, editor information of the input message field to an original condition.

In one or more embodiments herein, related systems comprise circuitry and/or programming for effecting the disclosure. In an embodiment, the circuitry and/or programming are any combination of hardware, software, and/or firmware configured to implement the embodiments herein depending upon the design choices of a system designer. Also, in an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments herein are shown in the drawings. However, the embodiments herein are not limited to the specific methods and components disclosed herein. The description of a method step or a component referenced by a numeral in a drawing is applicable to the description of that method step or component shown by that same numeral in any subsequent drawing herein.

DETAILED DESCRIPTION

Figure 1:
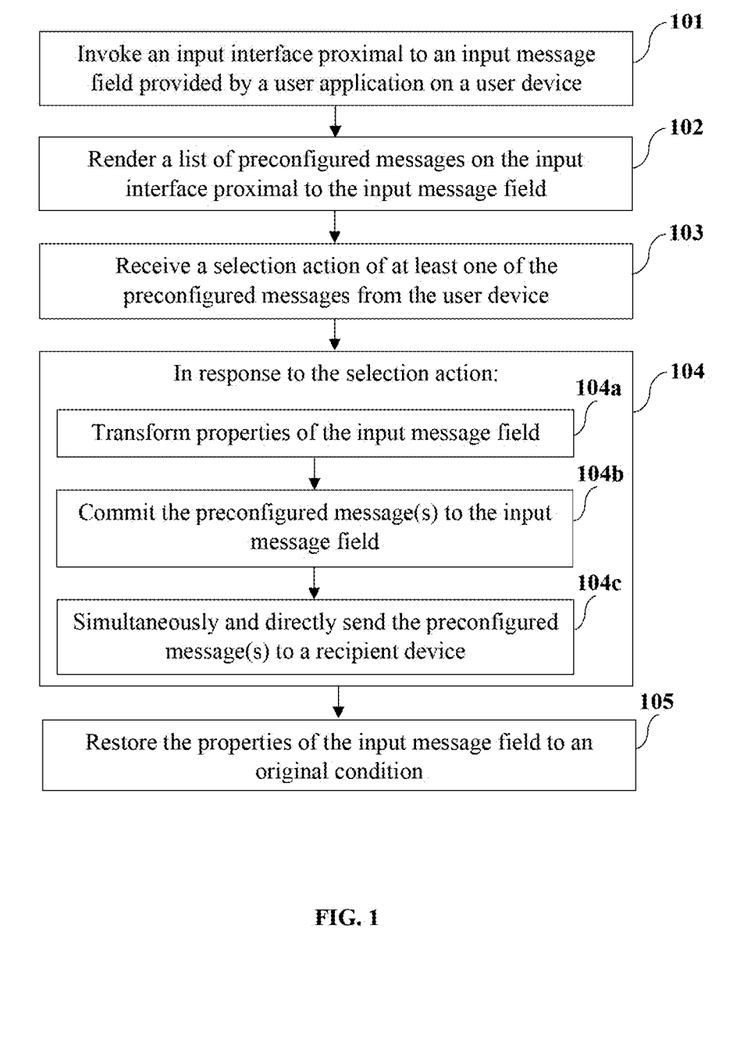
FIG. 1 illustrates a flowchart of a method for directly sending messages with minimal user input, according to an embodiment herein.

FIG. 1 illustrates a flowchart of a method for directly sending messages with minimal user input, according to an embodiment disclosed herein. The method disclosed herein employ a direct message sending engine (DMSE) and at least one processor for directly sending messages, for example, preconfigured messages, with minimal user input, for example, with a single action in a time-efficient manner for an enhanced messaging experience. The DMSE comprises one or more modules defining computer program instructions, which when executed by the processor(s), cause the processor(s) to directly send messages with minimal user input in a time-efficient manner for an enhanced messaging experience.

When a user invokes 101 an input interface, for example, a touch-enabled keyboard interface, proximal to an input message field provided by a user application, for example, a messaging application, on a user device, the DMSE renders 102 a list of preconfigured messages on the input interface. As used herein, "input message field" refers to an input field, for example, a target text field, that is a part of the user application, where a user can enter a text message. The preconfigured messages comprise, for example, templated messages such as quick replies, clipboard messages or clips, etc., displayed as a list on the input interface. When a user performs a single selection action, for example, a tap action or a click action, on at least one of the preconfigured messages on the input interface, the DMSE, in communication with a sensing unit of the user device, receives 103 the selection action from the user device. The selection action on the preconfigured message(s) is a single action performed by the user for directly sending the preconfigured message(s) to a recipient device. In response to the selection action 104, the DMSE transforms 104*a* properties of the input message field, commits 104*b* the selected preconfigured message(s) to the input message field, and simultaneously and directly 104*c* sends the selected preconfigured message(s) to the recipient device. On committing the selected preconfigured message(s) to the input message field, the DMSE simultaneously executes a programmatic simulation of an action key press, thereby directly sending the selected preconfigured message(s) to the recipient device free of a manual send action user input. The DMSE, in communication with the sensing unit, detects the presence of the selected preconfigured message(s) in the input message field and executes the programmatic simulation of the action key press. After sending the preconfigured message(s), the DMSE restores 105 the properties comprising, for example, editor information of the input message field to an original condition.

In an embodiment, on invoking the input interface to initiate messaging through the user application, the user may enter an input message in the input message field and then select at least one preconfigured message(s). In this embodiment, in response to the selection action, the DMSE transforms the properties of the input message field, appends the selected preconfigured message(s) to the input message entered in the input message field, and simultaneously and directly sends the input message appended with the selected preconfigured message(s) to the recipient device. On appending the preconfigured message(s) to the input message entered in the input message field, the DMSE simultaneously executes a programmatic simulation of the action key press, thereby directly sending the input message appended with the selected preconfigured message(s) to the recipient device free of a manual send action user input. After sending the input message appended with the selected preconfigured message(s), the DMSE restores the properties comprising, for example, the editor information of the input message field to an original condition.

In the method disclosed herein, the DMSE transforms the input message field to execute the direct sending of messages with minimal user input, for example, with a single action, instead of adapting the input interface, for example, the touch-enabled keyboard interface, to the input message field. The DMSE changes the behaviour of the input message field instead of changing the behaviour of the input interface. When the user invokes the input interface, the input interface contains a reference, for example, editor information or EditorInfo, to the input message field. This reference defines multiple attributes of a text editing object with which an input method communicates. The attributes comprise, for example, the type of text contained in the input message field, the current cursor position, and a return type attribute. The DMSE changes the return type attribute of the input interface to IME_ACTION_SEND, which performs a send operation, thereby programmatically simulating pressing of an action key, for example, an enter key or a return key, to directly send the message entered and/or selected by the user to the recipient device. When the message is committed to the input message field, the DMSE sends a keycode of the action key to the input message field programmatically without user input or a press on the action key or return key button positioned proximal to the input message field, thereby directly sending the message in a time-efficient manner for an enhanced messaging experience.

In an embodiment, the DMSE executes the following algorithm to directly send a message to a recipient device with minimal user input, for example, with a single action. The DMSE stores current type properties of the input message field. The type properties define a type of operation that is performed on pressing the action key. For example, the type ACTION DONE defines a "done" operation that is performed on pressing the action key, which closes an input method editor (IME) associated with the input message field. In another example, the type ACTION_NEXT defines a "next" operation that is performed on pressing the action key, which provides another line or another field for entry of text by a user. In the method disclosed herein, the DMSE sets the type of the input message field to ACTION_SEND programmatically, which defines a "send" operation that is performed for delivering the input message entered and/or selected by the user to the recipient device. In an embodiment, the DMSE programmatically sends the action key signal to the input message field, for example, via an input connection object that handles all communication between the input interface and the input message field. The DMSE sends the action key signal to the input message field, for example, using a send key event function of the input connection object. The input message field that is a part of the container application, that is, the user application, receives the action key signal and processes the "send" operation, whereby the message is directly sent to the recipient device. The DMSE then restores the type properties of the input message field.

The method disclosed herein, therefore, allows users to send messages, for example, clips from a clipboard, quick replies, etc., directly with minimal user input, for example, with a single action such as a single tap action or a single click action, without having to manually press an action key, for example, an enter key or a return key, provided proximal to the input message field, thereby enhancing the user's messaging experience.

Figure 2A:
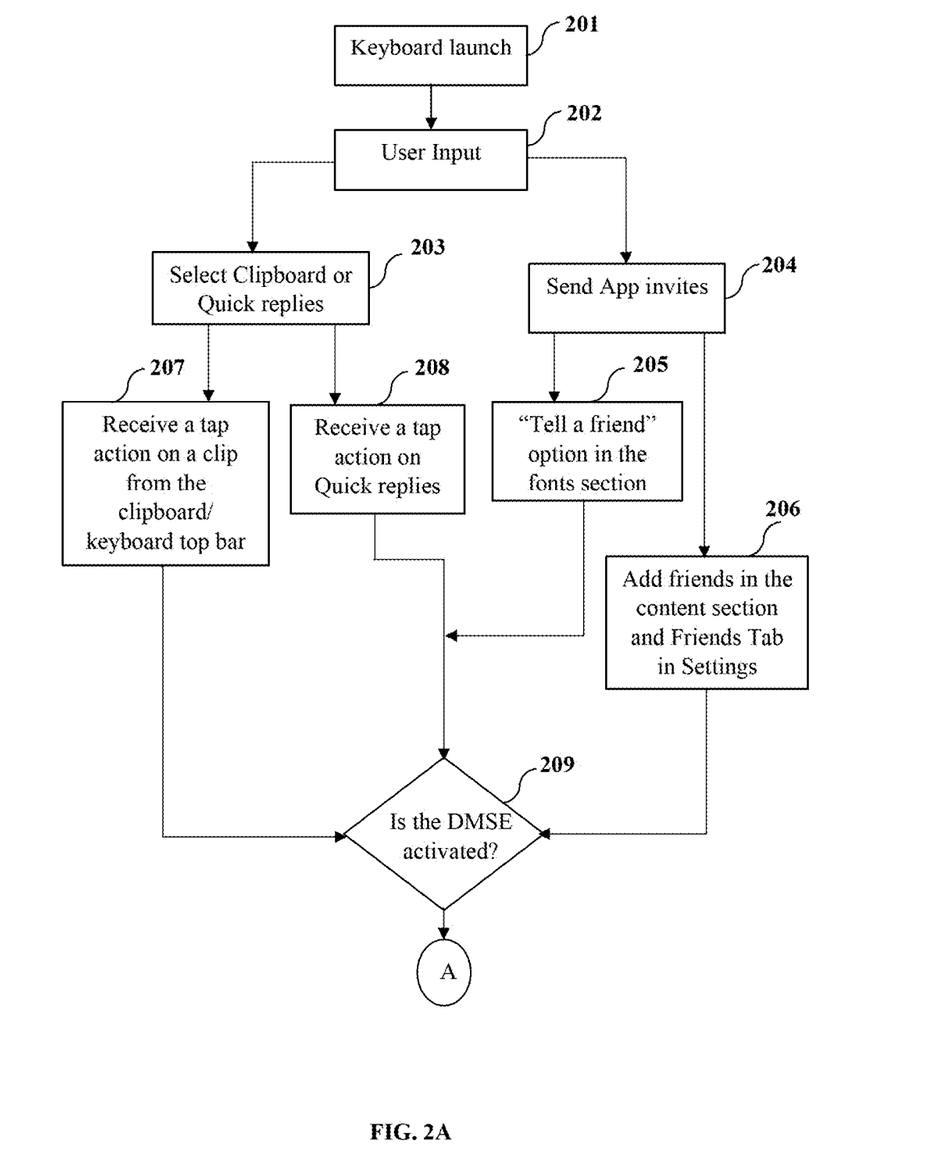
FIGS. 2A-2B illustrate a flowchart of a method for directly sending preconfigured text messages with minimal user input, according to an embodiment herein.
Figure 2B:
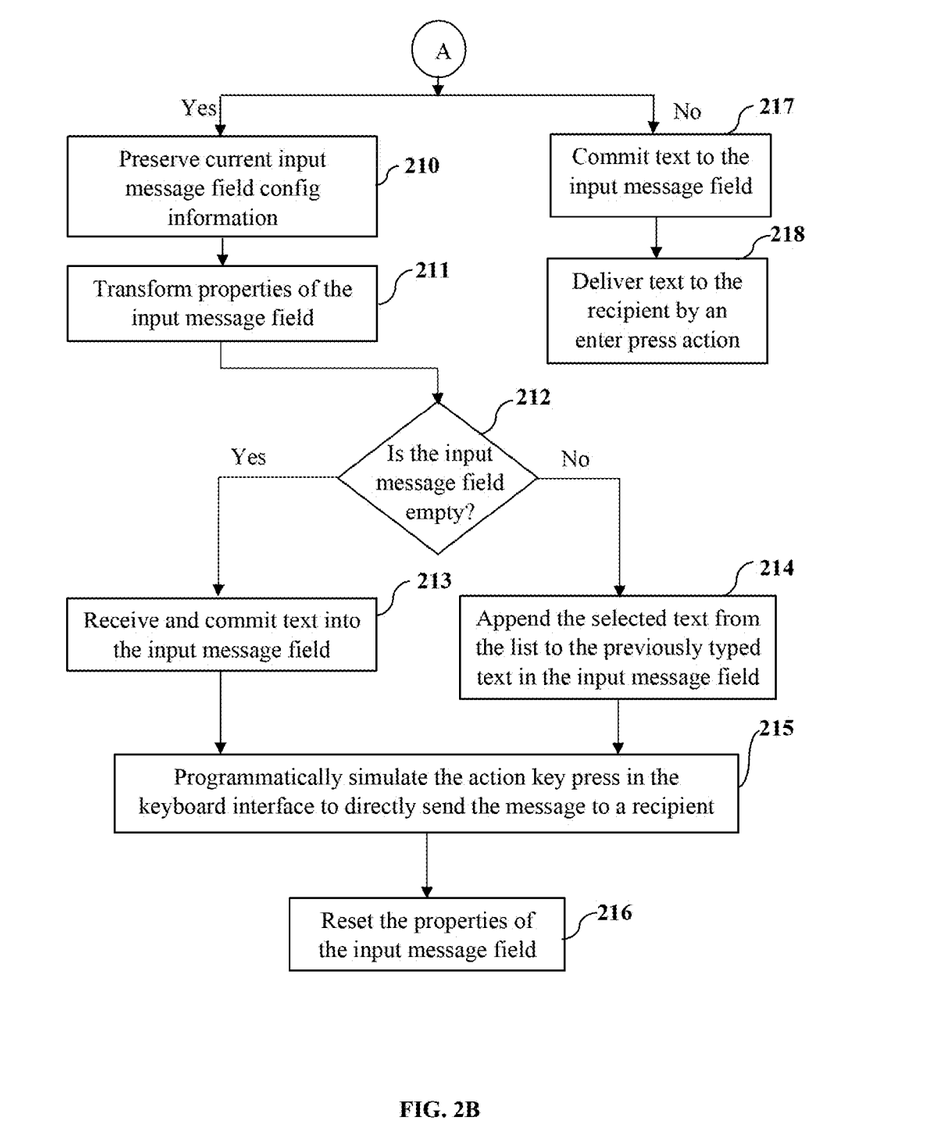

FIGS. 2A-2B illustrate a flowchart of a method for directly sending preconfigured text messages with minimal user input, according to an embodiment of the disclosed herein. Consider an example where a user wishes to send a text message to a recipient via a user application, for example, a chat application, deployed on a user device such as a smartphone. When the user invokes the chat application on a user device, the chat application renders an input message field to allow the user to enter a text message. When the user clicks on the input message field, an input interface, for example, a keyboard interface, is launched 201 which brings the input message field into focus. The direct message sending engine (DMSE) allows users to directly send input messages, for example, text messages, with a single click action without having to separately paste the text messages on the input message field and manually press an action key. In an embodiment, the DMSE renders a list of preconfigured messages, for example, through a clipboard or a quick replies list. The user may provide an input 202 or perform an input action, for example, by selecting 203 a clipboard or the quick replies list or by sending 204 DMSE application (App) invites from a contents section. That is, the user may select a clipboard option from a top bar of the keyboard interface or the user may choose to send quick replies from a fonts section in the top bar of the keyboard interface. If the user selects the clipboard option, the user can proceed to select a clip from the list. In an embodiment, the DMSE allows the user to send the clip, on a single press action, without pasting the clip to the input message field. If the user selects the quick replies option from the fonts section, the user may choose to send, for example, jokes, quotes, poems, pre-written messages, and customized text messages through a single tap action. Furthermore, the user may send the DMSE App invites through an App invite link with or without a message through a single tap action from the contents section. The user may send the DMSE App invites to other users by tapping on a "Tell A Friend" option 205 provided in the fonts section. The user may also send App invite links and text by tapping on an "Add Friends" option 206 provided in the contents section of a "Friends" tab in settings.

In the method disclosed herein, a determination 209 of whether the DMSE is activated on the user device is made. If the DMSE is activated on the user device, the DMSE preserves 210 current configuration (config) information of the input message field and transforms 211 properties of the input message field. The DMSE determines 212 whether the input message field is empty. If the input message field is empty and if the user selects the clipboard option at step 203, the DMSE receives 207 the tap action on the clip, or if the user selects the quick replies option at step 203, the DMSE receives 208 the tap action on a quick reply message and in response to the respective tap action, receives and commits 213 the text of the selected clip or the selected quick reply message into the input message field, and programmatically simulates 215 the action key press in the keyboard interface to directly send the text message to the recipient. In an embodiment, the DMSE transforms the input message field from a multiline input field to a single line input field and the programmatic simulation of the action key press executes a send operation to deliver the text message to the recipient, instead of executing a newline operation that creates a new line for the user to enter a message.

If there is some pre-written or pre-typed text in the input message field, then the DMSE appends 214 the text of the selected clip or the selected quick reply message to the previously typed text in the input message field and programmatically simulates 215 the action key press in the keyboard interface to directly send the pre-typed text with the appended text of the selected clip to the recipient. After the DMSE sends the text message, the DMSE restores or resets 216 the properties, for example, the editor information of the input message field to its original value. If the DMSE is not activated on the user device, the input text entered with or without a clip or a quick reply message is committed 217 to the input message field and is delivered 218 to the recipient on performing an enter press action on a send button displayed on the graphical user interface (GUI) of the chat application.

Figure 3A:
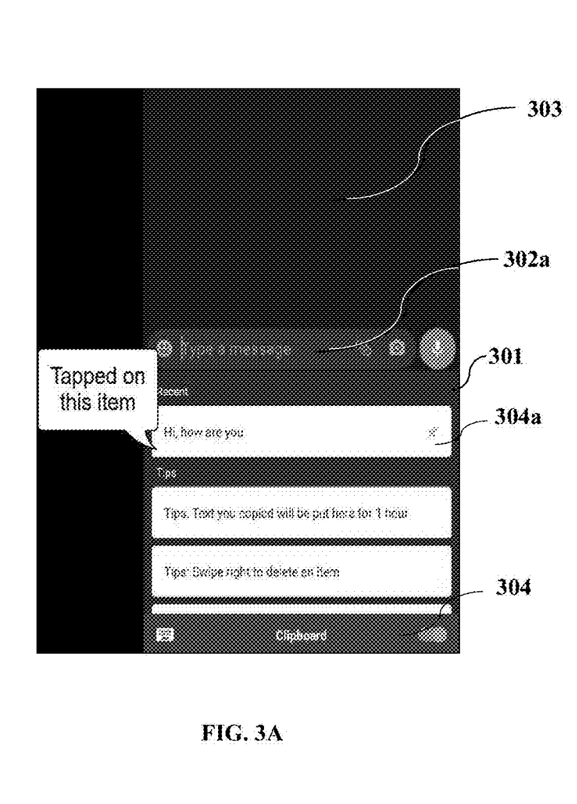
FIGS. 3A-3C illustrate screenshots of a graphical user interface provided by a system for directly sending preconfigured messages with minimal user input, according to an embodiment herein.
Figure 3B:
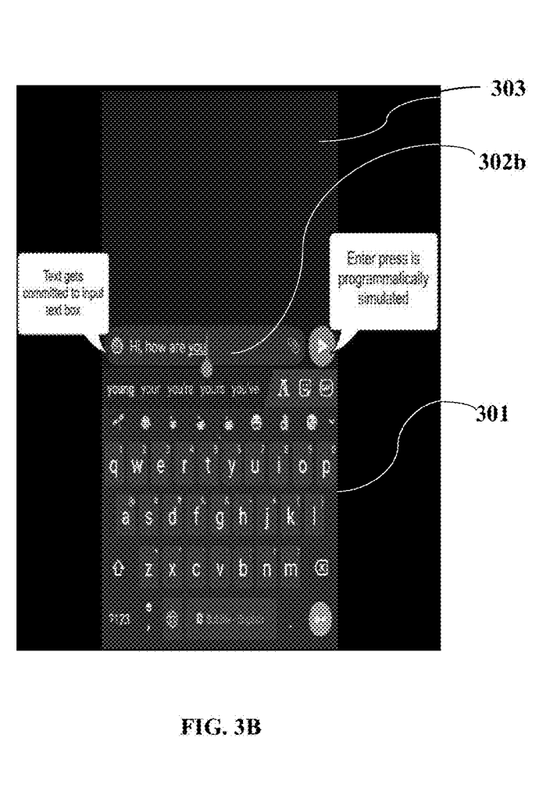
Figure 3C:
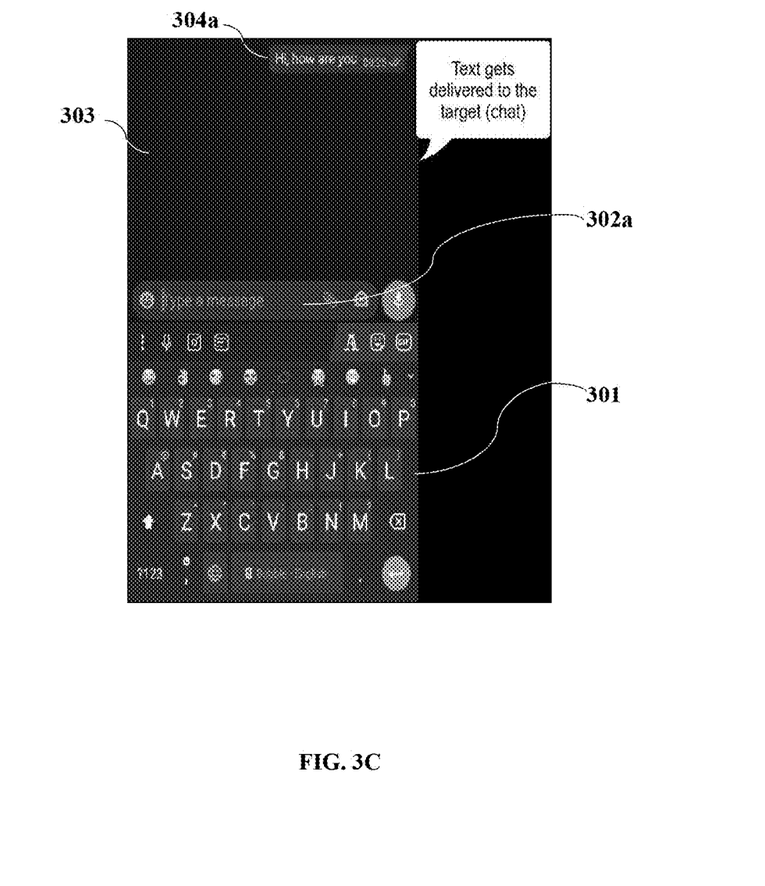

FIGS. 3A-3C illustrate screenshots of a graphical user interface (GUI) 303 provided by a system for directly sending preconfigured messages with minimal user input, according to an embodiment disclosed herein. In an embodiment, the direct message sending engine (DMSE) of the system disclosed herein is configured as an application (app) deployable on a user device, for example, a smartphone. After installing the DMSE application on the user device, in an embodiment, the user can launch the DMSE application by clicking on an application icon from a device application launcher of the user device. Consider an example where a user wishes to send a text message to a recipient via a user application, for example, a chat application, deployed on the user device. When the user invokes the chat application on the user device, the chat application renders an input message field 302a to allow the user to enter a text message. When the user clicks on the input message field 302a, an input interface, for example, a keyboard interface 301, is launched which brings the input message field 302a into focus. In an embodiment, the DMSE renders a list of preconfigured messages, for example, through a clipboard 304 as illustrated in FIG. 3A. In an embodiment, the clipboard 304 is accessible from a top bar of the keyboard interface 301. The user may select a preconfigured message, for example, a clip 304a, from the clipboard 304 by performing a single selection action, for example, a tap action, on the selected clip 304a.

In response to the tap action, if the DMSE is activated, the DMSE preserves the current configuration of the input message field 302a, transforms properties of the input message field 302a, and if the input message field 302b is empty, commits the selected clip 304a to the transformed input message field 302b as illustrated in FIG. 3B. On committing the selected clip 304a to the input message field 302b, the DMSE simultaneously executes a programmatic simulation of an action key press and directly sends the selected clip 304a to a recipient device, free of a manual send action user input, as illustrated in FIG. 3C. The selected clip 304a is displayed on the GUI 303 as illustrated in FIG. 3C. After sending the selected clip 304a, the DMSE transforms the input message field 302b to the original input message field 302a by restoring the properties comprising, for example, the editor information of the input message field 302a to an original condition as illustrated in FIG. 3C. If the DMSE is not activated, the selected clip 304a is committed to the input message field 302a and delivered to the target recipient when the user presses a send button displayed on the GUI 303 of the chat application.

Figure 4A:
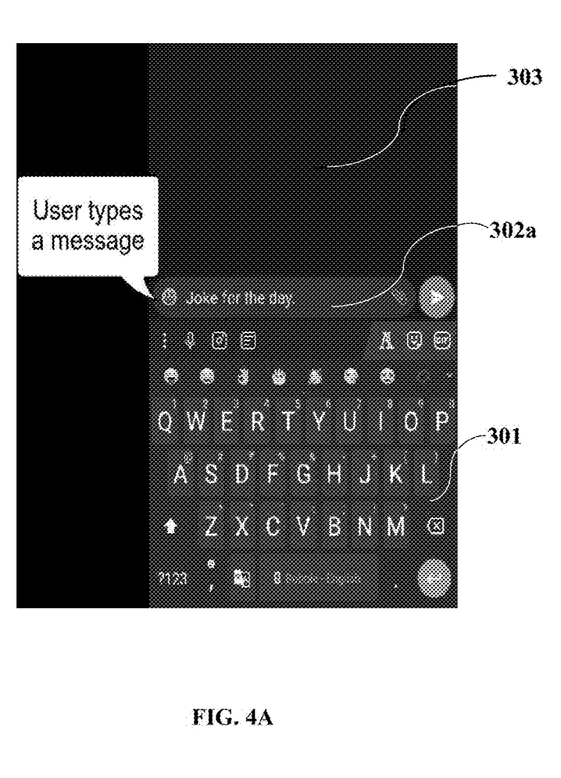
FIGS. 4A-4D illustrate screenshots of a graphical user interface provided by the system for directly sending preconfigured messages appended to input text with minimal user input, according to an embodiment herein.
Figure 4B:
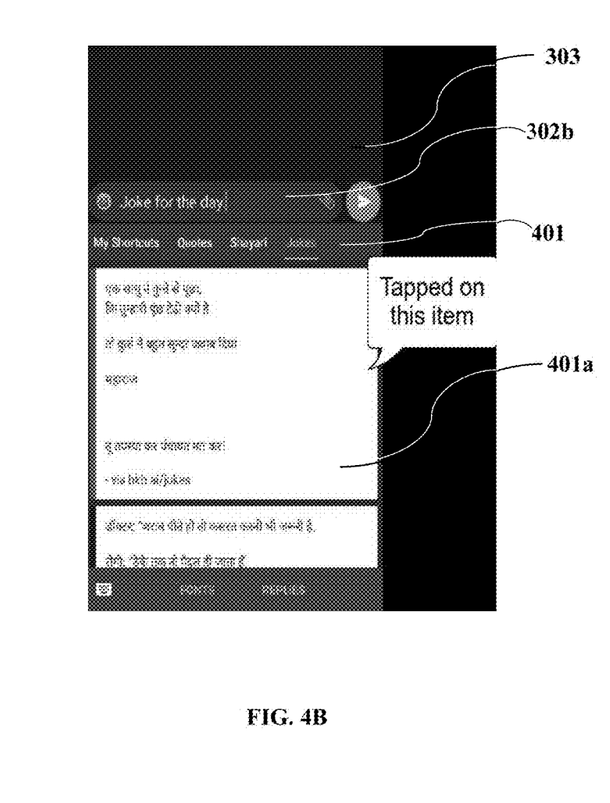

FIGS. 4A-4D illustrate screenshots of a graphical user interface (GUI) 303 provided by the system for directly sending preconfigured messages appended to input text with minimal user input, according to another embodiment disclosed herein. Consider an example where a user wishes to send a text message containing jokes to a recipient via a user application, for example, a chat application, deployed on the user device. When the user invokes the chat application on the user device, the chat application renders an input message field 302a to allow the user to enter a text message. When the user clicks on the input message field 302a, an input interface, for example, a keyboard interface 301, is launched which brings the input message field 302a into focus. In an example, the user types a text message, "Joke for the day", in the input message field 302a as illustrated in FIG. 4A. In an embodiment, the DMSE renders a list 401 of preconfigured messages, for example, jokes, through a quick replies joke tab in a fonts section of the keyboard interface 301 as illustrated in FIG. 4B. In an embodiment, the joke tab is accessible from a top bar of the keyboard interface 301. The user may select a joke 401a from the list 401 of jokes rendered at the joke tab by performing a single selection action, for example, a tap action, on the selected joke 401a.

Figure 4C:
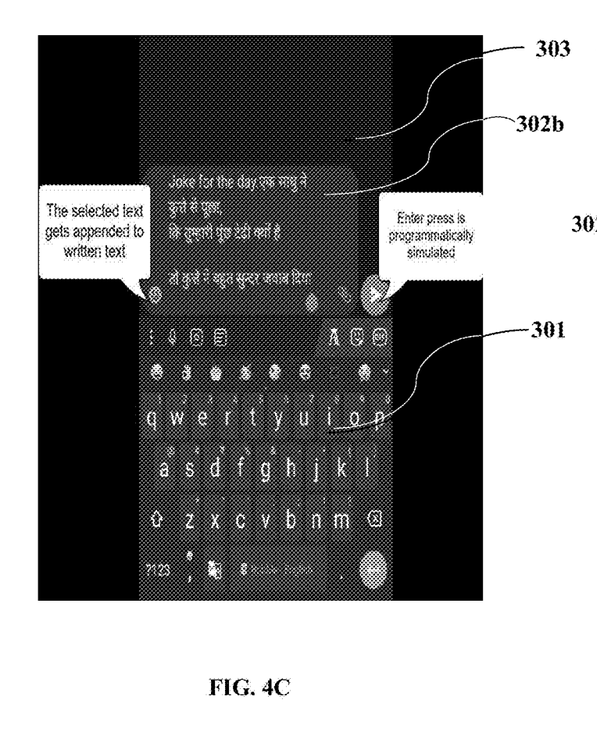
Figure 4D:
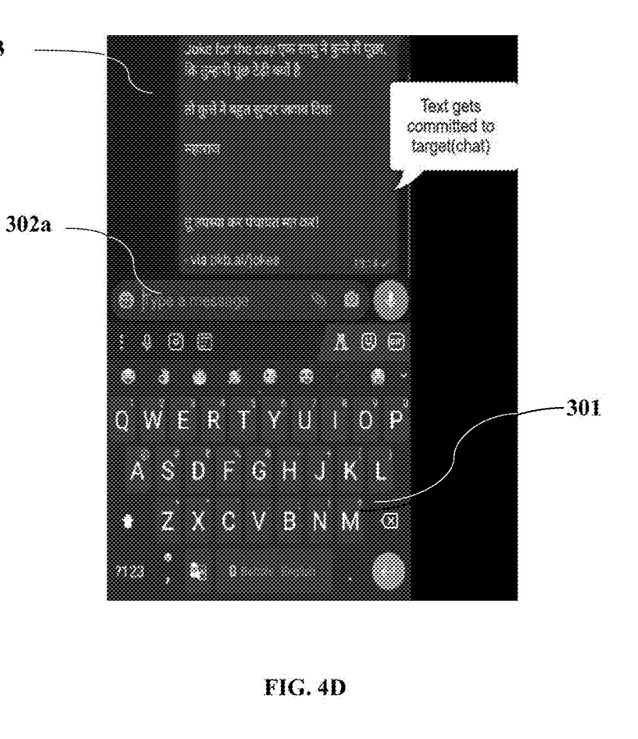

In response to the tap action, if the DMSE is activated, the DMSE preserves the current configuration of the input message field 302a, transforms properties of the input message field 302a, and appends the selected joke 401a to the text message "Joke for the day" in the transformed input message field 302b as illustrated in FIG. 4C. On appending the selected joke 401a to the text message in the input message field 302b, the DMSE simultaneously executes a programmatic simulation of an action key press as illustrated in FIG. 4C, and directly sends the text message with the appended joke 401a to a recipient device, free of a manual send action user input as illustrated in FIG. 4D. The text message with the appended joke 401a is displayed on the GUI 303 as illustrated in FIG. 4D. After sending the text message with the appended joke 401a, the DMSE transforms the input message field 3026 to the original input message field 302a by restoring the properties comprising, for example, the editor information of the input message field 302a to an original condition. If the DMSE is not activated, the selected joke 401*a* is appended to the text message in the input message field 302*a* and delivered to the target recipient when the user presses a send button displayed on the GUI 303 of the chat application.

Figure 5A:
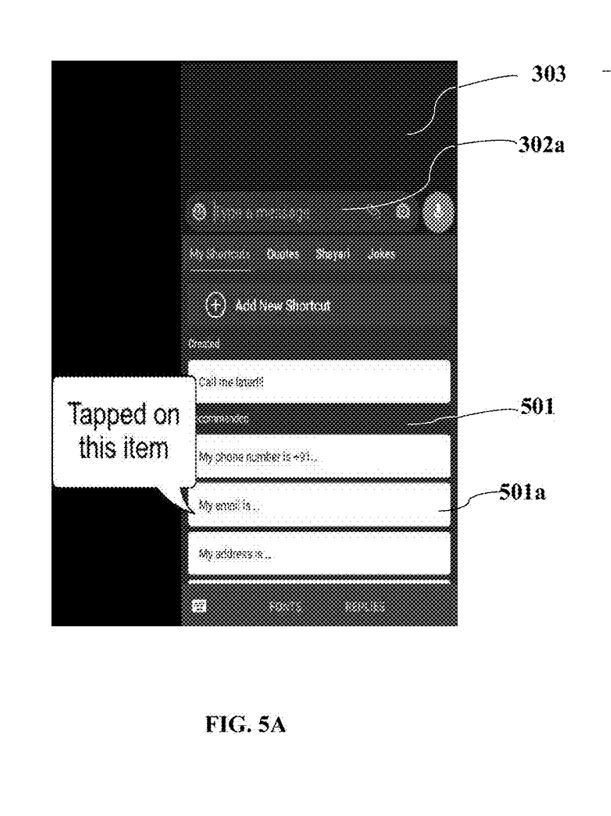
FIGS. 5A-5C illustrate screenshots of a graphical user interface provided by the system for directly sending preconfigured messages with minimal user input, according to an embodiment herein.
Figure 5B:
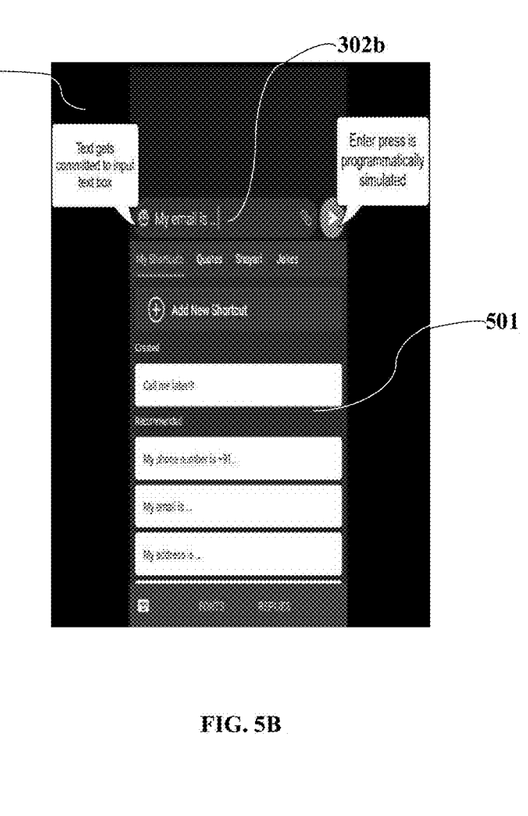
Figure 5C:
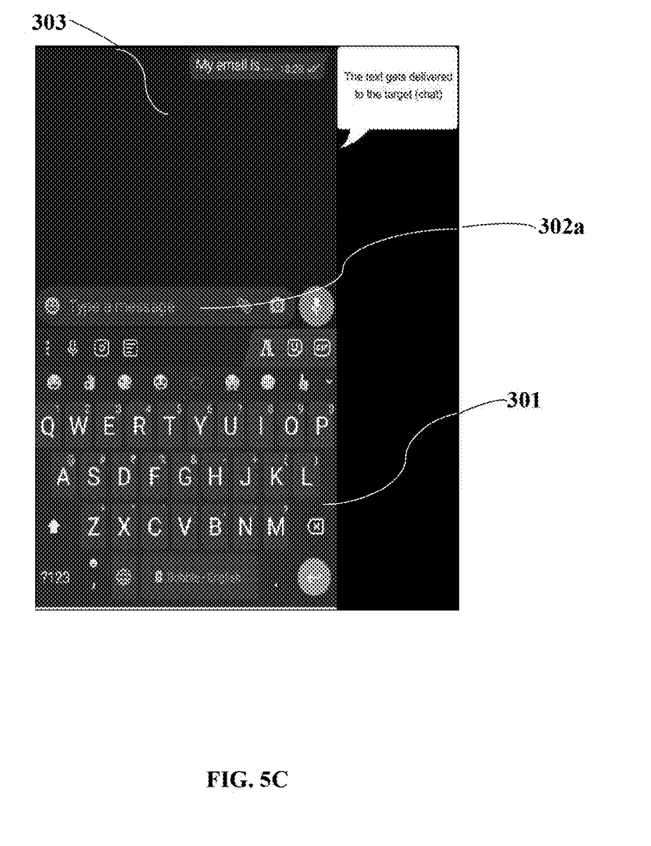

FIGS. 5A-5C illustrate screenshots of a graphical user interface (GUI) 303 provided by the system for directly sending preconfigured messages with minimal user input, according to another embodiment disclosed herein. Consider an example where a user wishes to send a text message to a recipient via a user application, for example, a chat application, deployed on the user device. When the user invokes the chat application on the user device, the chat application renders an input message field 302*a* to allow the user to enter a text message. When the user clicks on the input message field 302*a*, an input interface, for example, a keyboard interface 301, is launched which brings the input message field 302*a* into focus. In an embodiment, the DMSE renders a list 501 of preconfigured messages as illustrated in FIG. 5A. The user may select a preconfigured message 501*a* from the list 501 by performing a single selection action, for example, a tap action, on the selected message 501*a*.

In response to the tap action, if the DMSE is activated, the DMSE preserves the current configuration of the input message field 302*a*, transforms properties of the input message field 302*a*, and if the input message field 302*b* is empty, commits the selected message 501*a* to the transformed input message field 302*b* as illustrated in FIG. 5B. On committing the selected message 501*a* to the input message field 302*b*, the DMSE simultaneously executes a programmatic simulation of an action key press as illustrated in FIG. 5B, and directly sends the selected message 501*a* to a recipient device, free of a manual send action user input as illustrated in FIG. 5C. The selected message 501*a* is displayed on the GUI 303 as illustrated in FIG. 5C. After sending the selected message 501*a*, the DMSE transforms the input message field 302*b* to the original input message field 302*a* by restoring the properties comprising, for example, the editor information of the input message field 302*a* to an original condition. If the DMSE is not activated, the selected message 501*a* is committed to the input message field 302*a* and delivered to the target recipient when the user presses a send button displayed on the GUI 303 of the chat application.

Figure 6:
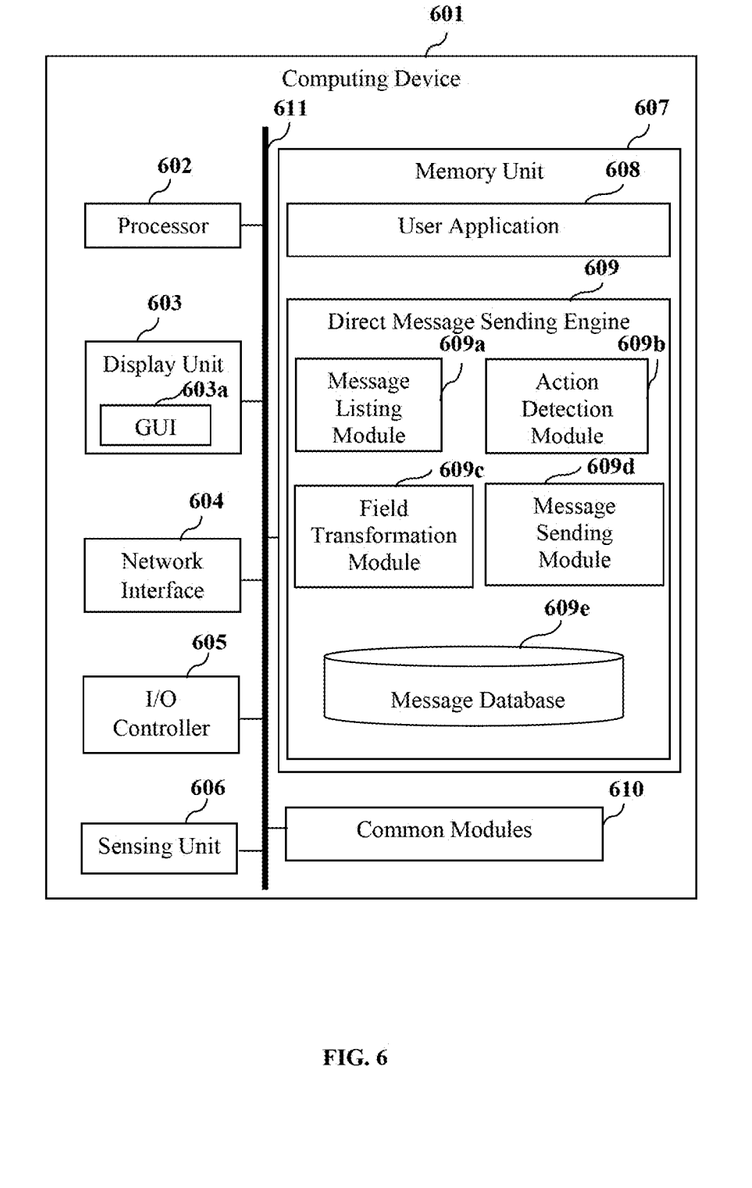
FIG. 6 illustrates an architectural block diagram showing an exemplary implementation of a direct message sending engine in a computing device for directly sending messages with minimal user input, according to an embodiment herein.

FIG. 6 illustrates an architectural block diagram showing an exemplary implementation of the direct message sending engine (DMSE) 609 in a computing device 601 for directly sending messages with minimal user input, according to an embodiment disclosed herein. The computing device 601 is an electronic device, for example, one or more of a personal computer, a tablet computing device, a mobile computer, a smartphone, a portable computing device, a laptop, a wearable computing device such as smart glasses, a smart watch, etc., a touch centric device, a workstation, a server, a client device, a portable electronic device, a network-enabled computing device, an interactive network-enabled communication device, a gaming device, an image capture device, a web browser, a portable media player, a video recorder, any other suitable computing equipment or combinations of multiple pieces of computing equipment.

Various aspects of the disclosure may be embodied as a system, a method, or a non-transitory, computer-readable storage medium having one or more computer-readable program codes stored thereon. Accordingly, various embodiments of the disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit". As used herein, "non-transitory, computer-readable storage medium" refers to all computer-readable storage media that contains and stores computer programs and data. Examples of the computer-readable media comprise hard drives, solid state drives, optical discs or magnetic disks, memory chips, a read-only memory (ROM), a register memory, a processor cache, a random-access memory (RAM), etc.

In an embodiment, the DMSE 609 is implemented using programmed and purposeful hardware of the computing device 601. In an embodiment, the DMSE 609 is accessible to users, for example, through a broad spectrum of technologies and user devices such as smartphones, tablet computing devices, endpoint devices, etc., with access to a network, for example, a short-range network or a long-range network. The network is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

As illustrated in FIG. 6, the computing device 601 comprises at least one processor 602 and a non-transitory, computer-readable storage medium, for example, a memory unit 607, for storing computer program instructions defined by modules, for example, 609*a*, 609*b*, 609*c*, 609*d*, and 609*e* of the DMSE 609. The memory unit 607 is used for storing program instructions, applications, and data. The memory unit 607 is, for example, a random-access memory (RAM) or another type of dynamic storage device that stores information and instructions for execution by the processor 602. The memory unit 607 also stores temporary variables and other intermediate information used during execution of the instructions by the processor 602. The computing device 601 further comprises ROMs or other types of static storage devices that store static information and instructions for execution by the processor 602. In an embodiment, the modules, for example, 609*a*, 609*b*, 609*c*, 609*d*, and 609*e* of the DMSE 609 are stored in the memory unit 607 as illustrated in FIG. 6.

The processor 602 is operably and communicatively coupled to the memory unit 607 for executing the computer program instructions defined by the modules, for example, 609*a*, 609*b*, 609*c*, and 609*d* of the DMSE 609. The processor 602 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 602 is implemented as a processor set comprising, for example, a programmed microprocessor and a math or graphics coprocessor. The DMSE 609 is not limited to employing the processor 602. In an embodiment, the DMSE 609 employs controllers or microcontrollers.

As illustrated in FIG. 6, the computing device 601 further comprises a data bus 611, a display unit 603, a network interface 604, an input/output (I/O) controller 605, a sensing unit 606, and common modules 610. The data bus 611 permits communications between the modules, for example, 602, 603, 604, 605, 606, 607, and 610. The display unit 603, via a graphical user interface (GUI) 603a, displays information, display interfaces, media content, user interface elements such as checkboxes, input text fields, etc., for example, for allowing a user to invoke and execute the DMSE 609 on the computing device 601. The GUI 603a comprises, for example, online web interfaces, web-based downloadable application interfaces, mobile-based downloadable application interfaces, etc.

The network interface 604 enables connection of the DMSE 609 to the network. In an embodiment, the network interface 604 is provided as an interface card also referred to as a line card. The network interface 604 is, for example, one or more of infrared interfaces, interfaces implementing of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc. The I/O controller 605 controls input action and output actions performed by the DMSE 609. The sensing unit 606 comprises one or more sensors operably coupled to the processor 602. The sensors comprise, for example, tactile sensors, image sensors, motion sensors, gesture sensors, etc., and other sensors configured to receive inputs of different types from a user.

The common modules 610 of the computing device 601 comprise, for example, input devices, output devices, fixed media drives such as hard drives, removable media drives for receiving removable media, etc. Computer applications and programs are used for operating the DMSE 609. The programs are loaded onto fixed media drives and into the memory unit 607 via the removable media drives. In an embodiment, the computer applications and programs are loaded into the memory unit 607 directly via the network.

In an embodiment, the DMSE 609 is invoked through a user application 608, for example, a messaging application, a business communication application, an electronic commerce (e-commerce) application, an email application, a gaming application, a media application, etc., deployed on the computing device 601 and operably coupled to the DMSE 609. The user application 608 is stored in the memory unit 607 of the computing device 601. In an embodiment, the DMSE 609 comprises multiple modules defining computer program instructions, which when executed by the processor 602, cause the processor 602 to directly send messages with minimal user input. In an embodiment, the modules of the DMSE 609 comprise a message listing module 609a, an action detection module 609b, and a field transformation module 609c, a message sending module 609d, and a message database 609e. When a user invokes an input interface, for example, a touch-enabled keyboard interface, proximal to an input message field provided by the user application 608 on the computing device 601, the message listing module 609a renders a list of preconfigured messages, for example, templated messages, clips, quick replies, jokes, etc., on the input interface. The list of preconfigured messages is stored in a data storage device, for example, the message database 609e.

When a user performs a single selection action, for example, a tap action or a click action, on at least one of the preconfigured messages on the input interface, the action detection module 609b, in communication with the sensing unit 606, receives the selection action from the computing device 601. In response to the selection action, the field transformation module 609c transforms properties of the input message field and commits the selected preconfigured message(s) to the input message field. The message sending module 609d, in communication with the field transformation module 609c, simultaneously and directly sends the selected preconfigured message(s) to a recipient device. On committing the selected preconfigured message(s) to the input message field, the message sending module 609d, in communication with the field transformation module 609c, simultaneously executes a programmatic simulation of an action key press, thereby directly sending the selected preconfigured message(s) to the recipient device free of a manual send action user input. The message sending module 609d, in communication with the sensing unit 606 and the field transformation module 609c, detects the presence of the selected preconfigured message(s) in the input message field and executes the programmatic simulation of the action key press as disclosed in the detailed description of FIG. 1. After the message sending module 609d sends the preconfigured message(s), the field transformation module 609c restores the properties comprising, for example, editor information of the input message field to an original condition.

In an embodiment, on invoking the input interface to initiate messaging through the user application 608, the user may enter an input message in the input message field and then choose to select at least one preconfigured message(s). The action detection module 609b, in communication with the sensing unit 606, receives the selection action from the computing device 601. In this embodiment, in response to the selection action, the field transformation module 609c transforms the properties of the input message field and appends the selected preconfigured message(s) to the input message entered in the input message field. The message sending module 609d, in communication with the field transformation module 609c, simultaneously and directly sends the input message appended with the selected preconfigured message(s) to a recipient device. On appending the preconfigured message(s) to the input message present in the input message field, the message sending module 609d, in communication with the field transformation module 609c, simultaneously executes a programmatic simulation of the action key press, thereby directly sending the input message appended with the selected preconfigured message(s) to the recipient device free of a manual send action user input. After sending the input message appended with the selected preconfigured message(s), the field transformation module 609c restores the properties comprising, for example, editor information of the input message field to an original condition.

The message listing module 609a, the action detection module 609b, the field transformation module 609c, and the message sending module 609d are disclosed above as software executed by the processor 602. In an embodiment, the modules, for example, 609*a*, 609*b*, 609*c*, and 609*d* of the DMSE 609 are implemented completely in hardware. In another embodiment, the modules, for example, 609*a*, 609*b*, 609*c*, and 609*d* of the DMSE 609 are implemented by logic circuits to carry out their respective functions disclosed above. In another embodiment, the DMSE 609 is also implemented as a combination of hardware and software including one or more processors, for example, 602, that are used to implement the modules, for example, 609*a*, 609*b*, 609*c*, 609*d*, and 609*e* of the DMSE 609. The processor 602 retrieves instructions defined by the message listing module 609*a*, the action detection module 609*b*, the field transformation module 609*c*, and the message sending module 609*d* from the memory unit 607 for performing respective functions disclosed above.

For purposes of illustration, the detailed description refers to the modules, for example, 609*a*, 609*b*, 609*c*, 609*d*, and 609*e* of the DMSE 609 being run locally on a single computer system; however the scope of the method and the system disclosed herein is not limited to the modules, for example, 609*a*, 609*b*, 609*c*, 609*d*, and 609*e* of the DMSE 609 being run locally on a single computer system via the operating system and the processor 602, but may be extended to run remotely over the network by employing a web browser and a remote server, a mobile phone, or other electronic devices. In an embodiment, one or more portions of the system disclosed herein are distributed across one or more computer systems (not shown) coupled to the network.

The non-transitory, computer-readable storage medium disclosed herein stores computer program instructions executable by the processor 602 for directly sending messages with minimal user input. The computer program instructions implement the processes of various embodiments disclosed above and perform additional steps that may be required and contemplated for directly sending messages with minimal user input. When the computer program instructions are executed by the processor 602, the computer program instructions cause the processor 602 to perform the steps of the method for directly sending messages with minimal user input as disclosed above. In an embodiment, a single piece of computer program code comprising computer program instructions performs one or more steps of the method disclosed above. The processor 602 retrieves these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. The computer program codes comprising computer readable and executable instructions can be implemented in any programming language. In an embodiment, the computer program codes or software programs are stored on or in one or more mediums as object code. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments disclosed herein, a module or an engine or a unit includes any suitable logic.

The method and the system disclosed herein render a list of preconfigured messages on an input interface for convenient selection by a user to allow the user to quickly and adequately express and communicate their thoughts or ideas to a recipient with minimal user input, for example, with a single action. Moreover, the method and the system disclosed herein allow users to send a message with a single action without having to manually press an action key button such as an enter button or a send button provided on the GUI of the user application, thereby saving the time of the users and enhancing the user experience. Furthermore, the method and the system disclosed herein allow users to enter a message in the input message field and select one or more preconfigured messages from the rendered list of preconfigured messages, which are subsequently appended to the previously entered message and directly sent to the recipient. Not having to edit the text and perform multiple click actions to send a message to a recipient saves the time of the users, thereby providing an improved messaging experience. Furthermore, the method and the system disclosed herein programmatically simulate the action key press to allow direct sending of messages with a single action without a manual press on an action key button.

The foregoing examples and illustrative implementations of various embodiments have been provided merely for explanation and are in no way to be construed as limiting of the embodiments herein. While the disclosure has been described with reference to various embodiments, illustrative implementations, drawings, and techniques, it is understood that the words, which have been used herein, are words of description and illustration, rather than words of limitation. Further, although the disclosure has been described herein with reference to particular means, materials, embodiments, techniques, and implementations, the disclosure is not intended to be limited to the particulars disclosed herein; rather, the disclosure extends to all functionally equivalent structures, methods and uses, such as are within the scope of the appended claims. It will be understood by those skilled in the art, having the benefit of the teachings of this specification, that the embodiments disclosed herein are capable of modifications and other embodiments disclosed herein may be effected and changes may be made thereto, without departing from the scope and spirit of the disclosure.

We claim:

1. A system for directly sending messages with minimal user input, the system comprising:
   an electronic device comprising an input device, at least one processor, a memory unit operably and communicatively coupled to the at least one processor, and a display unit;
   a sensing unit comprising one or more of a plurality of sensors operably coupled to the at least one processor of the electronic device; and
   a direct message sending engine operably coupled to the sensing unit, the at least one processor, and a messaging application deployed on the electronic device, wherein the direct message sending engine configured to:
   receive a user selection action from the input device of the electronic device to invoke an input interface of the messaging application;
   render a list of preconfigured messages to be displayed on the display unit based on the received user selection action;
   receive a single action executed on at least one of the list of preconfigured messages;

transform properties of an input message field of the input interface;

commit the at least one of the list of preconfigured messages to the input message field based on the transformed properties of the input message field; and execute a simulation of an action key press to send the at least one of the list of preconfigured messages to a recipient device;

wherein the direct message sending engine is further configured to check if the input message field is empty, and wherein the direct message sending engine is further configured to commit the at least one of the list of preconfigured messages based on the empty input message field, and wherein the direct message sending engine is configured to append the at least one of the list of preconfigured messages to the input message, and wherein the direct message sending machine is configured to send the selected one or more preconfigured messages from a list of preconfigured messages, which are appended to the previously entered message and directly send the appended messages to a recipient, and wherein the direct message sending machine is configured to allow the users to send messages, and wherein the messages includes clips from a clipboard, and quick replies, directly with minimal user input, and wherein the minimal user input is a single action and wherein the single action includes a single tap action or a single click action, without having to manually press an enter key or a return key, provided proximal to the input message field, thereby enhancing the user's messaging experience, and wherein the direct message sending machine is configured to preserve the current configuration of the input message field, to transform properties of the input message field, and appends the selected joke to the text message in the transformed input message field, and wherein the DMSE simultaneously executes a programmatic simulation of an action key press, and directly sends the text message with the appended joke to a recipient device after appending the selected joke to the text message in the input message field.

2. The system as claimed in claim 1, wherein the user selection action invokes a touch-enabled keyboard interface of the input interface.

3. The system as claimed in claim 2, wherein the touch-enabled keyboard interface is positioned proximal to the input message field.

4. The system as claimed in claim 1, wherein the direct message sending engine is further configured to transform the input message field from a multiline input field to a single line input field.

5. The system as claimed in claim 1, wherein the input message filed is configured to receive an input message from a user.

6. A method for directly sending messages with minimal user input, the method comprising:
  rendering, by an input device of the electronic device, a touch-enabled keyboard interface on a display unit of the electronic device;
  receiving, via the touch-enabled keyboard interface, a user selection action from the input device of the electronic device, by a direct message sending engine in communication with a sensing unit;
  rendering, by the direct message sending engine, a list of preconfigured messages to be displayed on the display device based on the received user selection action;
  receiving, by the direct message sending engine, a single action executed on at least one of the list of preconfigured messages;
  transforming, by the direct message sending engine, properties of an input message field of the input interface;
  committing, by the direct message sending engine, the at least one of the list of preconfigured messages to the input message field based on the transformed properties of the input message field; and
  executing, by the direct message sending engine, a simulation of an action key press to send the at least one of the list of preconfigured messages to a recipient device;
  wherein the input message field is empty, and wherein the step of committing of the at least one of the list of preconfigured messages is based on the empty input message field, wherein the direct message sending engine is configured to append the at least one of the list of preconfigured messages to the input message, and wherein the direct message sending machine is configured to send the selected one or more preconfigured messages from a list of preconfigured messages, which are appended to the previously entered message and directly send the appended messages to a recipient, and wherein the direct message sending machine is configured to allow the users to send messages, and wherein the messages includes clips from a clipboard, and quick replies, directly with minimal user input, and wherein the minimal user input is a single action and wherein the single action includes a single tap action or a single click action, without having to manually press an enter key or a return key, provided proximal to the input message field, thereby enhancing the user's messaging experience, and wherein the direct message sending machine is configured to preserve the current configuration of the input message field, to transform properties of the input message field, and appends the selected joke to the text message in the transformed input message field, and wherein the DMSE simultaneously executes a programmatic simulation of an action key press, and directly sends the text message with the appended joke to a recipient device after appending the selected joke to the text message in the input message field.

7. The method as claimed in claim 6, wherein the transforming of the input message field comprises conversion of the input message field from a multiline input field to a single line input field.

8. The method as claimed in claim 6, wherein the input message filed is configured to receive an input message from a user.

* * * * *